United States Patent
Inturi et al.

(10) Patent No.: US 7,914,916 B2
(45) Date of Patent: Mar. 29, 2011

(54) THERMALLY STABLE HIGH ANISOTROPIC HIGH MAGNETIC MOMENT FILMS

(75) Inventors: Venkateswara Rao Inturi, Shakopee, MN (US); Mark Thomas Kief, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 279 days.

(21) Appl. No.: 12/025,275

(22) Filed: Feb. 4, 2008

(65) Prior Publication Data

US 2009/0197121 A1    Aug. 6, 2009

(51) Int. Cl.
  G11B 5/39      (2006.01)
  G11B 5/33      (2006.01)
  B05D 5/12      (2006.01)

(52) U.S. Cl. .............. 428/812; 204/192.2; 360/319; 360/125.03; 360/125.08; 360/125.12; 428/815; 428/678

(58) Field of Classification Search .............. None
See application file for complete search history.

(56) References Cited

U.S. PATENT DOCUMENTS

| | | | | |
|---|---|---|---|---|
| 6,132,892 | A * | 10/2000 | Yoshikawa et al. | 428/812 |
| 6,828,046 | B2 * | 12/2004 | Ikeda et al. | 428/812 |
| 7,061,731 | B2 | 6/2006 | Larson et al. | |
| 7,094,483 | B2 | 8/2006 | Pelhos et al. | |
| 2005/0214589 | A1 | 9/2005 | Shibamoto et al. | |
| 2006/0054494 | A1 | 3/2006 | Reiss | |
| 2006/0115684 | A1 * | 6/2006 | Choi | 428/812 |
| 2009/0053560 | A1 * | 2/2009 | Noma | 428/812 |

OTHER PUBLICATIONS

Jing-Yun Wang, Bao-Gen, Shao-Ying Zhang, Zhi-Gang Sun, and Wen-Shan Zhan; Magnetic properties of Ho2(Co1-xFex)17 compounds; J. Phys. D: Appl. Phys. 32 (1999) 2371-2375.

H. J. Richter; The Transition from longitudinal to perpendicular recording; J. Phys. D: Appl Phys. 40 (2007) R149-R177.

M.S. Cohen; Anisotropy in Permalloy Films Evaporated at Grazing Incidence J. Appl. Phys., 32, 87S-88S (1961).

* cited by examiner

*Primary Examiner* — Kevin M Bernatz
(74) *Attorney, Agent, or Firm* — Kinney & Lange, P.A.

(57) ABSTRACT

High magnetic moment films FeCo(X, Y), where X is a transition metal element and Y is a rare earth element are formed using off-axis static deposition techniques. The films have tunable magnetic anisotropy from 0 Oe to greater than 500 Oe that are thermally stable beyond nominal photoresist curing temperatures. By using off-axis static deposited FeCo(X, Y) films as seed layers to normally deposited FeCo films, inplane anisotropy and the magnetic moment can be controlled for specific design needs. Epitaxial-like growth (column-to-column matching) from the off-axis static FeCo(X,Y) seed layers to normally deposited FeCo films is attributed to sustained anisotropy in the entire film.

22 Claims, 7 Drawing Sheets

THERMALLY STABLE HIGH ANISOTROPIC HIGH MAGNETIC MOMENT FILMS

BACKGROUND

The present invention relates generally to the field of magnetic data storage. In particular, the present invention relates to thermally stable high anisotropic FeCo(X, Y) films for writer pole materials.

In magnetic storage and retrieval systems, longitudinal storage media are approaching an upper limit of storage density. The discrete magnetized regions, or bits, which have magnetization vectors lying in the plane of the magnetic film, are approaching a size where they become thermally unstable. This is termed the superparamagnetic limit. In order to increase the storage density, systems have now been developed where the bits have magnetization vectors essentially normal to the film surface. These are called perpendicular storage and retrieval systems. The storage density of perpendicular systems can be an order of magnitude higher than longitudinal systems.

In perpendicular recording, the magnetic medium has the easy axis of magnetization perpendicular to the film surface. There is also a magnetically soft underlayer (SUL) between the recording layer and the substrate. A perpendicular read head includes a magnetically soft yoke, one or more turns of a conductor, a main pole and a return pole. The main pole is the write pole with submicron dimensions that defines the bit size. In contrast to longitudinal recording, where the bits are written with a fringing field, in perpendicular recording, the bits are generated with a deep gap field that passes through the magnetic layer into the SUL before it returns through the return pole.

Write poles of perpendicular transducers typically are of different materials than the rest of the yoke. Materials with high saturation magnetization, low coercivity and high magnetic anisotropy are desired. The rest of the yoke can be a soft magnetic material.

A consistent issue with perpendicular head recording is erase after write, (EAW) which is due to a delayed relaxation of the magnetization once the write current in the head is switched off. A remanent magnetization of the write pole causes erasure, which cannot be tolerated in a disc drive. High magnetic anisotropy in writer pole material that favors magnetization parallel to the disc surface will minimize or eliminate EAW. This same feature is desired in other magnetic head components such as shields and return poles.

Write pole materials must have high saturation magnetization, or moment, low coercivity and strong anisotropy. They must also have the thermal stability to withstand the temperature excursions during processing and afterwards. These properties are also required in magnetic shield components in longitudinal and perpendicular heads. One of the highest known moments at room temperature is exhibited by the alloy $Fe_{65}Co_{35}$ which has a moment close to 2.4 T. FeCo films exhibiting magnetic anisotropy can be fabricated with off-axis static plasma deposition methods in which the plane of the substrate is tilted to the direction of the incident plasma. Unfortunately, anisotropic FeCo films deposited in this manner are not thermally stable and lose their anisotropy when subjected to elevated temperatures. There is a need, therefore, for magnetic film structures that have the moment, coercivity and anisotropy of FeCo that maintain anisotropy at elevated temperatures.

SUMMARY

In one embodiment, a magnetic structure for application in magnetic storage and retrieval systems comprises a first magnetic layer of off-axis deposited magnetic material selected from a magnetic group consisting of FeCoX, FeCoY, FeCo(X,Y), FeNiX, FeNiCoX, FeNiY, FeNiCoY, FeNi(X,Y), and FeNiCo(X,Y). X is at least one transition metal element, Y is at least one rare earth element.

In another embodiment, a magnetic structure for application in magnetic storage and retrieval systems comprises a seed layer and a magnetic layer of FeCo. The seed layer comprises at least one static off-axis deposited magnetic layer selected from a group consisting of FeCoX, FeCoY, FeCo(X,Y), FeNiX, FeNiCoX, FeNiY, FeNiCoY, FeNi(X,Y), and FeNiCo(X,Y) wherein X is at least one transition metal element, Y is at least one rare earth element.

In another embodiment, a method of forming a magnetic structure comprises static off-axis depositing at least one magnetic layer of thermally stable high anisotropic magnetic material selected from a group consisting of FeCoX, FeCoY, FeCo(X,Y), FeNiX, FeNiCoX, FeNiY, FeNiCoY, FeNi(X,Y), and FeNiCo(X,Y) to form a seed layer, and depositing a magnetic layer of FeCo over the seed layer. X is at least one transition metal element, and Y is at least one rare earth element.

DETAILED DESCRIPTION

FeCo films with high moment (close to 2.4 T) and high anisotropy (Hk>25 Oe) can be fabricated by off-axis static deposition. Unfortunately, the films are not thermally stable and lose their anisotropy when subjected to temperatures greater than 200° C. Anisotropic FeCoX films where X is any of a number of transition metal elements such as Ta, Ru, etc. fabricated by off-axis deposition are thermally stable up to 300° C. Anisotropic FeCoY films where Y is any of a number of rare earth elements fabricated by static off-axis deposition such as Ho, Tb, etc. are also thermally stable up to 300° C. Off-axis deposited FeCoX and FeCoY films exhibit high Hk but the X and Y additions dilute the Hk of FeCo. In one embodiment of the invention, off-axis deposited FeCoX and FeCoY films are used as seed layers for conventional perpendicular deposition of FeCo films.

FeCo films normally (i.e. perpendicular to the substrate) deposited on off-axis deposited FeCo(X,Y) seed layers retain the anisotropy and thermal stability of the seed layer and also exhibit the high moment (close to 2.4 T) of FeCo. The high moment can be maximized by minimizing the thickness of the off-axis deposited FeCo(X,Y) seed layer. Furthermore, the anisotropy direction and magnitude can be controlled by the deposition angle, alloy additions and seed layer thickness.

Figure 1:
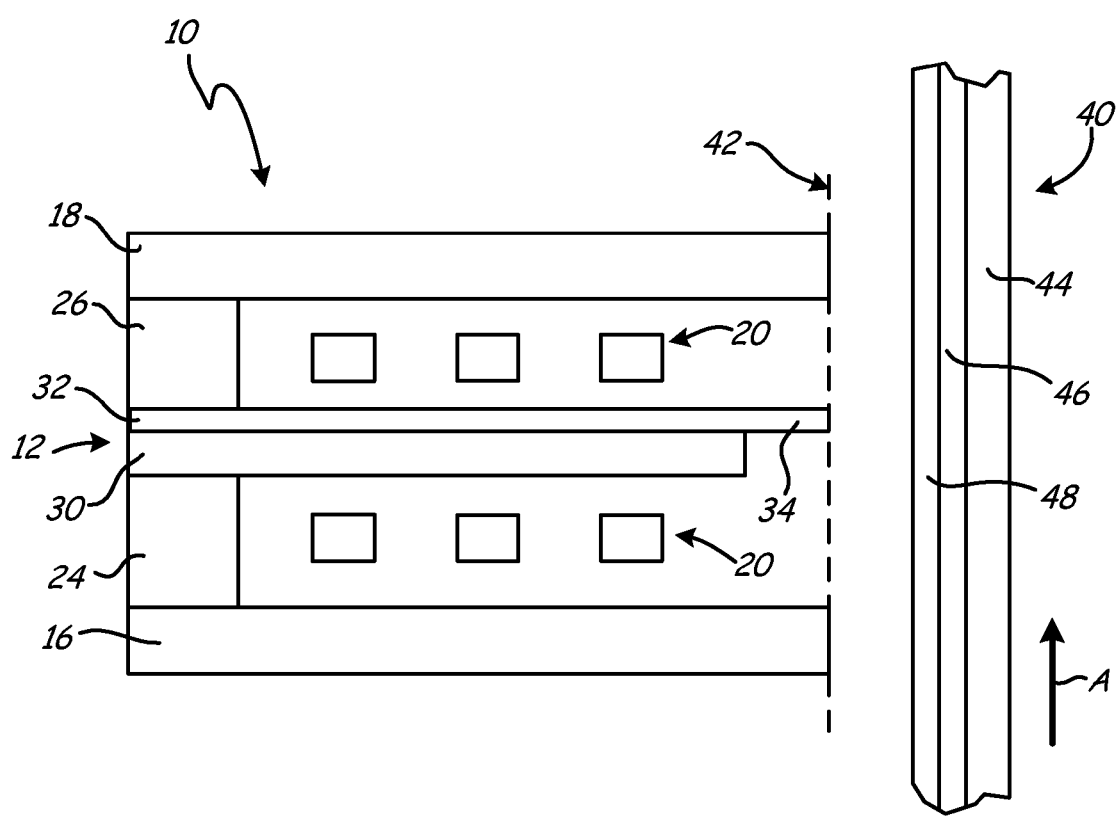
FIG. 1 is a cross-section view of a magnetic writer.

FIG. 1 is a cross-section view of magnetic writer 10, which includes write pole 12, first return pole 16, second return pole 18, and conductive coil 20. Write pole 12 is magnetically coupled to first return pole 16 by first magnetic stud 24, and to second return pole 18 by second magnetic stud 26. Conductive coil 20 surrounds write pole 12 such that portions of conductive coil 20 are disposed between write pole 12 and first return pole 16, and between write pole 12 and second return pole 18. Write pole 12 includes yoke 30 and write pole body 32 having write pole tip 34.

First return pole 16, second return pole 18, first magnetic stud 24, and second magnetic stud 26 may comprise soft magnetic materials such as NiFe. Conductive coil 20 may comprise a material with low electrical resistance such as Cu. Write pole body 32 may comprise a high moment soft magnetic material such as FeCo, and yoke 30 may comprise a soft magnetic material such as NiFe to improve the efficiency of flux delivery to write pole body 32.

Magnetic writer 10 confronts magnetic medium 40 at medium confronting air bearing surface (ABS) 42 defined by write pole tip 34, first return pole 16, and second return pole 18. Magnetic medium 40 includes substrate 44, soft under layer (SUL) 46, and medium layer 48. SUL 46 is disposed between substrate 44 and medium layer 48. Magnetic medium 40 is positioned proximate to magnetic writer 10 such that the surface of medium layer 48 opposite SUL 46 faces write pole 12. Magnetic medium 40 is shown merely for purposes of illustration, and may be any type of medium usable in conjunction with magnetic writer 10, such as composite media, continuous/granular coupled (CGC) media, discrete track media, and bit-patterned media.

Magnetic writer 10 is carried over the surface of magnetic medium 40, which is moved relative to magnetic writer 10 as indicated by arrow A such that write pole 12 trails first return pole 16, leads second return pole 18, and is used to physically write data to magnetic medium 40. In order to write data to magnetic medium 40, a current is caused to flow through conductive coil 20. The magnetomotive force in conductive coil 20 causes magnetic flux to travel from write pole tip 34 perpendicularly through medium layer 48, across SUL 46, and through first return pole 16 and first magnetic stud 24 to provide a first closed magnetic flux path. The direction of the write field at the medium confronting surface of write pole tip 34, which is related to the state of the data written to magnetic medium 40, is controllable based on the direction that the first current flows through first conductive coil 20.

Stray magnetic fields from outside sources, such as a voice coil motor associated with translation of magnetic writer 10 relative to magnetic medium 40, may enter SUL 46. Due to the closed magnetic path between write pole 12 and first return pole 16, these stray fields may be drawn into magnetic writer 10 by first return pole 16. In order to reduce or eliminate these stray fields, second return pole 18 is connected to write pole 12 via second magnetic stud 26 to provide a flux path for the stray magnetic fields. The stray fields enter first return pole 16, travel through first magnetic stud 24 and second magnetic stud 26, and exit magnetic writer 10 via second return pole 18.

Magnetic writer 10 is shown merely for purposes of illustrating an example construction that may be used in conjunction with the principles of the present invention, and variations on this design may be made. For example, while write pole 12 includes write pole body 32 and yoke 30, write pole 12 can also be comprised of a single layer of magnetic material. In addition, a single trailing return pole 18 may be provided instead of the shown dual return pole writer configurations. Furthermore, a shield may be formed to extend from the trailing return pole toward write pole 12 proximate the medium confronting surface in a "trailing shield" magnetic writer design.

As aerial bit density increases, writer pole tip dimensions decrease. To produce readable bits, the pole material needs to have high magnetic moment. At the same time, the material needs to exhibit strong magnetic anisotropy with easy axis parallel to the ABS to eliminate erase after write (EAW) in the recording medium. Finally, the properties need to be thermally stable up to and exceeding temperatures experienced during processing and use. These properties (i.e., strong magnetic anisotropy, high magnetic moment, thermal stability) are also required by high frequency inductors, shield materials, return pole materials, and others.

Figure 2:
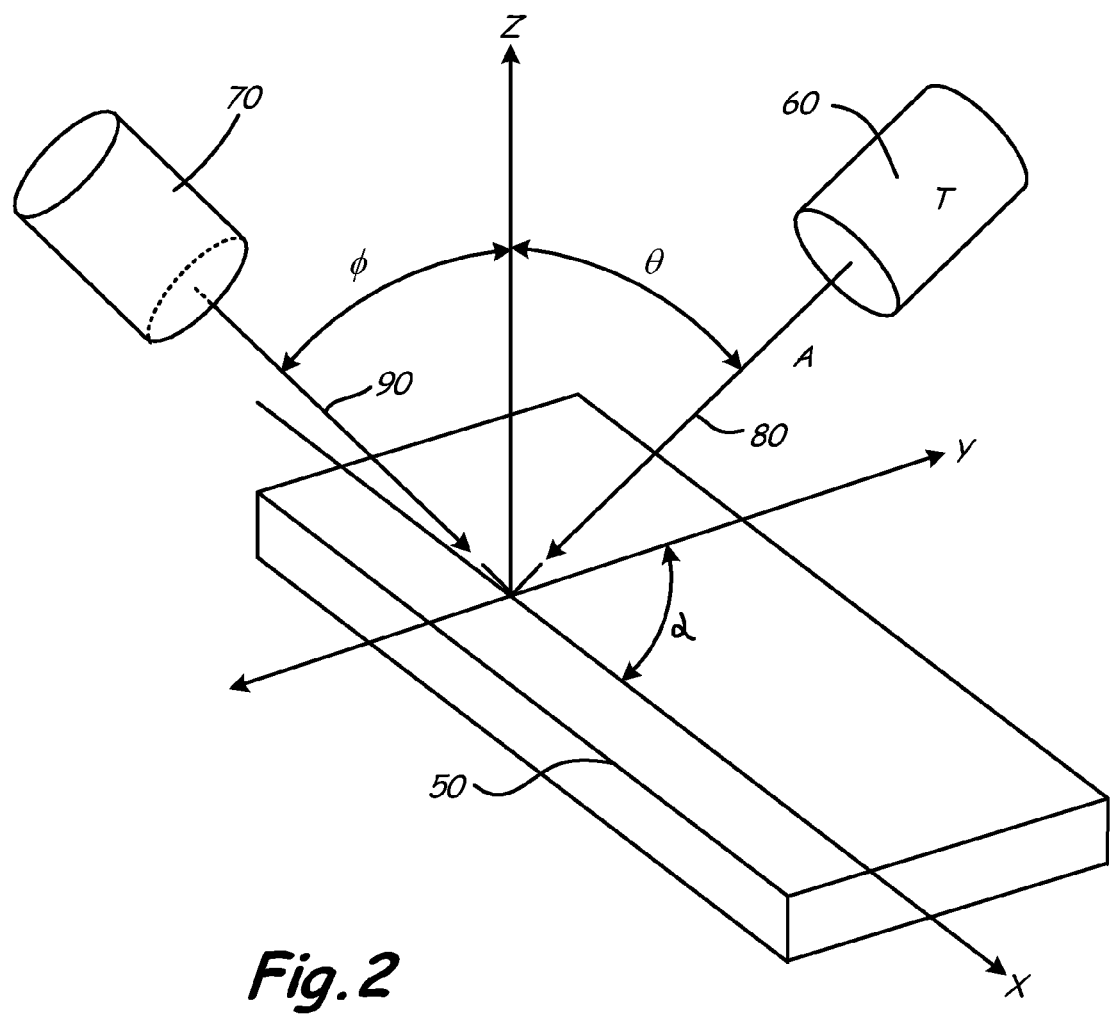
FIG. 2 is a perspective view of static off-axis deposition of high anisotropy writer pole material.

One method to produce Fe based films with strong magnetic anisotropy is by off-axis deposition. Off-axis deposition onto substrate 50 from point source 60 is shown in FIG. 2. The angle theta ($\theta$) of deposition is measured from a surface normal. A surface normal for substrate 50 is shown in FIG. 2 as the Z axis of the reference Cartesian coordinate axes. During oblique deposition, substrate 50 can be non-rotating for deposition from point source 60. Point source 60 can be a physical vapor deposition (PVD) source such as a cathodic arc PVD, e-beam PVD, pulsed laser PVD, ion beam PVD, or sputter deposition PVD source. Alternatively, a collimating device may be used to limit the incidence angle of deposition flux to the desired range of oblique angles. In another embodiment, a line source may be created by a shutter containing a slit. As discussed later, preferred angles of deposition to induce magnetic anisotropy are between 30 and 80 degrees. The angle alpha (a) is preferably 90°. Multiple sources may be used for deposition as shown in FIG. 2 where additional source 70 is directed at substrate 50 at angle phi ($\varphi$), where the lines of flux 80 and 90 are preferably coplanar. Magnetic anisotropy will be either perpendicular to the deposition direction (i.e. parallel to the x-axis) or parallel to the deposition direction (i.e. parallel to the y-axis). Lower angles of deposition will produce perpendicular anisotropy, and higher angles will result in parallel anisotropy.

Figure 3:
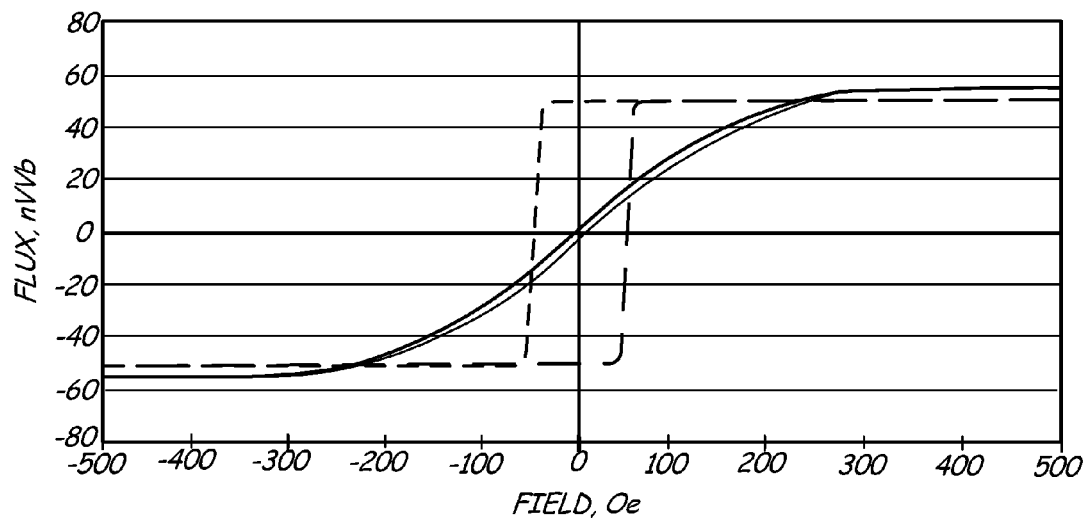
FIG. 3 are BH hysteresis loops of static off-axis deposited FeCo film.
Figure 4:
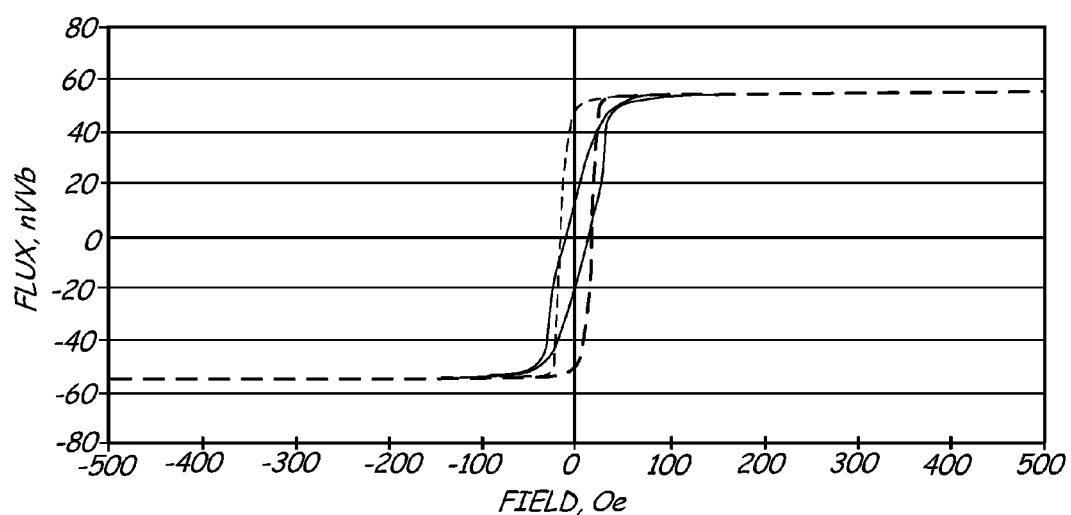
FIG. 4 are BH loops of the film in FIG. 3 after a two hour 225° C. anneal.
Figure 5:
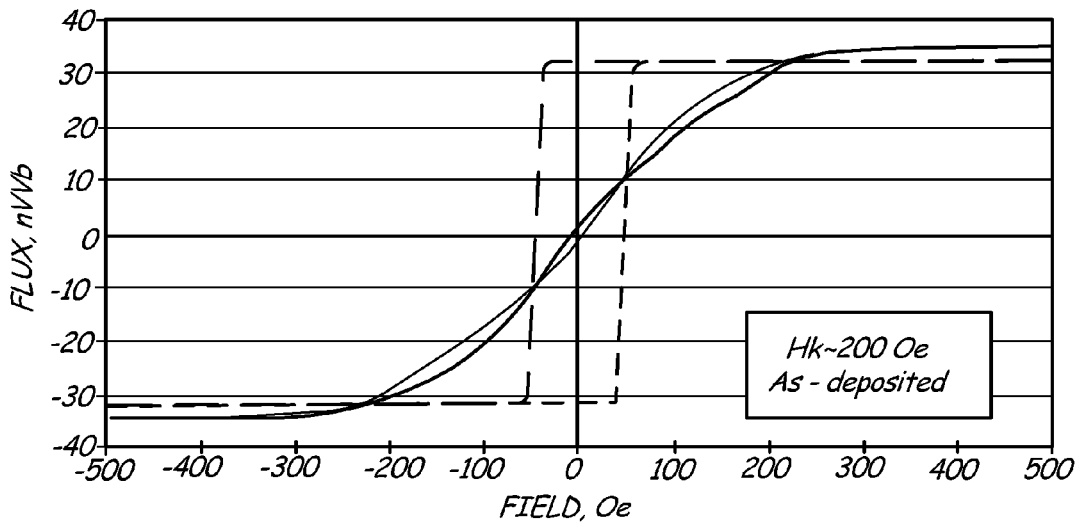
FIG. 5 are BH loops of a static off-axis deposited FeCo film containing 2-3 atomic percent Ta.
Figure 6:
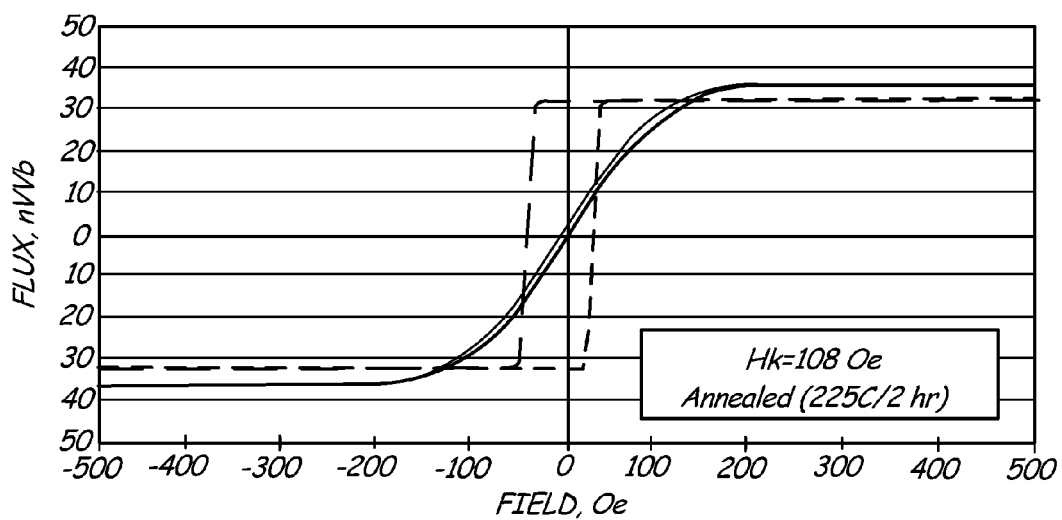
FIG. 6 are BH loops of the film in FIG. 5 after a two hour 225° C. anneal.

One of the best materials for use in perpendicular write pole applications is FeCo. FeCo has a high moment close to 2.4 T and a magnetic anisotropy in off-axis static deposited films of about 200 Oe at room temperature as shown in FIG. 3. Unfortunately when annealed at 225° C. for two hours, the films lose their anisotropy as shown in FIG. 4. It is disclosed here that the combination of high moment, high anisotropy and thermal stability in off-axis deposited FeCo based films can be maintained by adding transition metal or Lanthanide-series rare earth elements to the films during deposition. FIG. 5 and FIG. 6 show the BH loops (hysteresis loops showing the relationship between the induced magnetic flux density B and the magnetizing force H) for off-axis deposited FeCo films containing 2 to 5 percent tantalum before and after annealing at 225° C. for two hours respectively. Magnetic anisotropy has been retained after the anneal.

Figure 7:
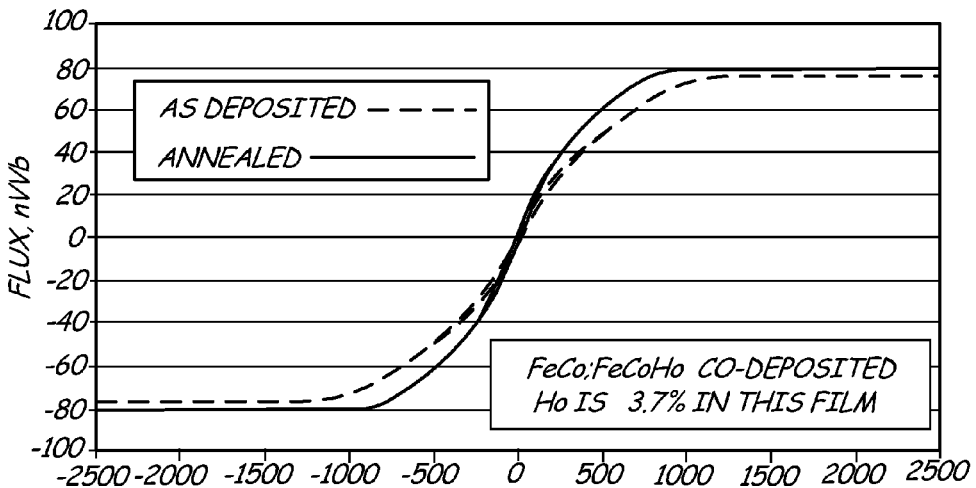
FIG. 7 are hard axis BH loops of two static off-axis FeCo: FeCoHo co-deposited films.

It has been shown that FeCo films produced by static (i.e. deposition on a stationary substrate) off-axis deposition show good anisotropy of about 200 Oe but lose the anisotropy after a 225° C. two hour anneal. On the other hand, when FeCoX where X is a transition metal element like Ta is produced by static off-axis deposition, anisotropy of greater than 100 Oe can be maintained after a two hour anneal at 225° C. as shown in FIG. 6. FeCoY films where Y is a rare earth element with unfilled F-orbitals such as Ho, exhibit the same feature. FIG. 7 shows the hard axis BH loops of a static off-axis FeCo:FeCoHo film produced by simultaneously depositing FeCo and FeCoHo films from FeCo and FeCoHo targets before and after a two hour 225° C. anneal. The anisotropy of this co-deposited film is over 500 Oe and is retained after the anneal. One embodiment of the invention is to use the static off-axis FeCo:FeCoHo co-deposited film as seed layer for FeCo films deposited normally (i.e. perpendicular) to the seed layer. The resulting multilayer films exhibit a high Hk of nearly 200 Oe or more with nearly 2.4 T moment.

Off-axis deposition according to M. S. Cohen (J. Appl. Phys., 32, 878 (1961)), generates chains of defects or agglomeration of crystallites in the films due to self shadowing during crystallite growth. The shape anisotropy in FeCo films is attributed to these defect structures. During annealing, it is suggested that the relative mobility of the Fe and Co atoms leads to defect annihilation and recrystallization and the resulting loss of anisotropy.

Transition metal atoms and rare earth atoms are larger than Fe and Co atoms, and have lower mobility in the FeCo matrix. These alloy additions stabilize the defect structures causing magnetic anisotropy by migrating to the defect sites and pinning them. The alloy additions both increase the anisotropy in as deposited films and prevent the loss of anisotropy due to annealing by stabilizing the defect structures at elevated temperatures.

Figure 8:
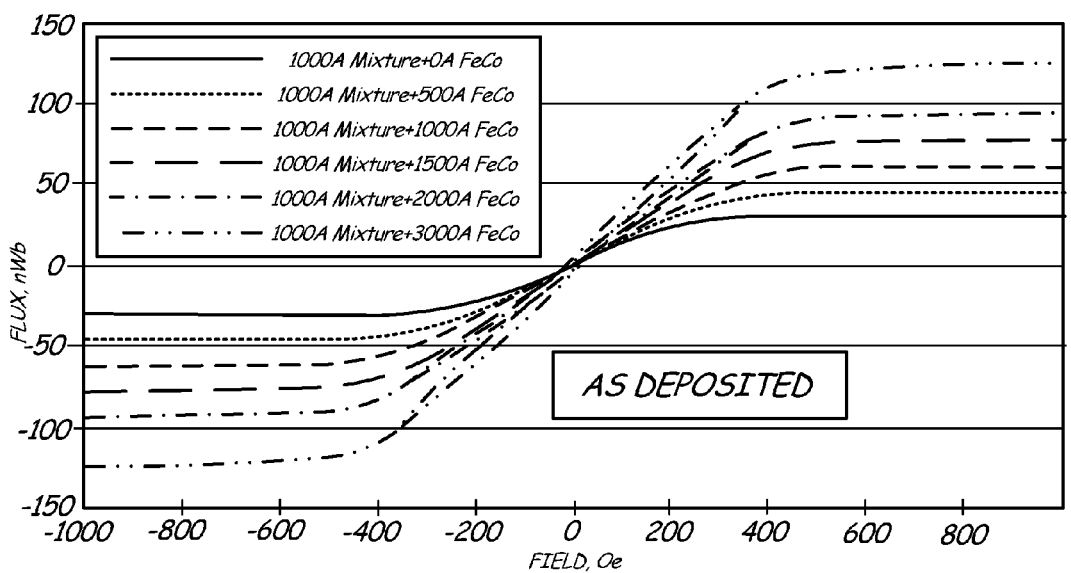
FIG. 8 are hard axis BH loops for FeCo films deposited at normal incidence on 1,000 Å thick static off-axis deposited FeCoHo seed layer films.
Figure 9:
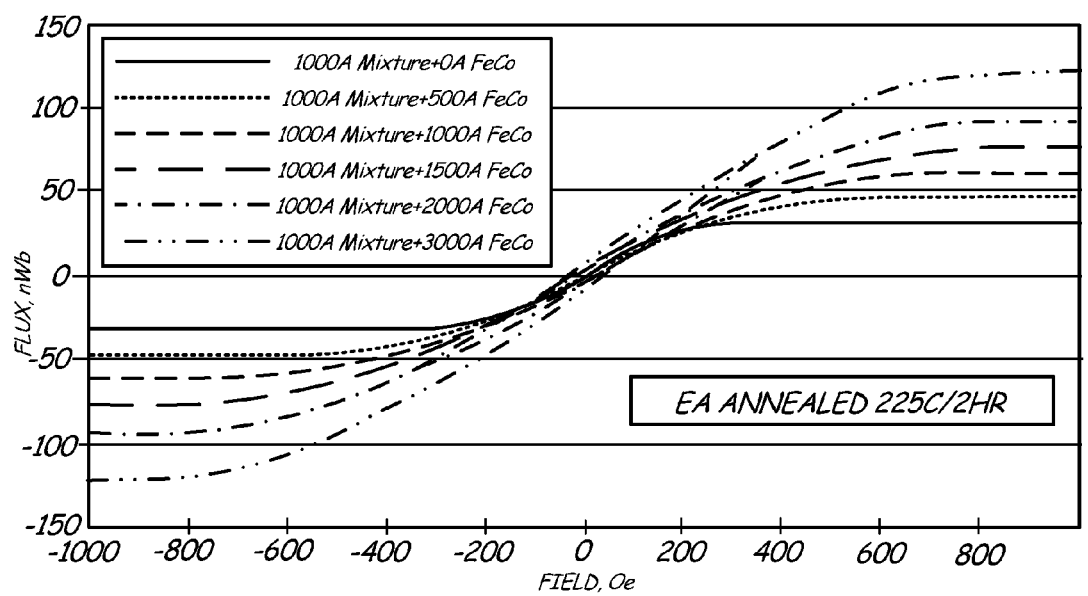
FIG. 9 are hard axis BH loops of the films in FIG. 8 after a two hour 225° C. anneal.

The addition of Ho into FeCo significantly reduces the moment. A series of measurements were made on normally (i.e. perpendicular to substrate) deposited FeCo films on 1,000 Å static co-deposited FeCo:FeCoHo films as a seed. Hard axis BH loops of these films are shown in FIGS. 8 and 9. The figures show BH loops for normally deposited FeCo films on 1,000 Å off-axis co-deposited FeCo:FeCoHo seed layers before and after a 225° C. 2 hour anneal. The thickness of the FeCo films ranged from zero to 3,000 Å. The saturation magnetization (i.e. the moment) of each sample can be controlled and decreased as the thickness of the FeCo layer is decreased illustrating the moment dilution introduced by the seed layer. The anisotropy is clearly maintained in each sample after the anneal. The 1,500 Å thick FeCo layer on the 1,000 Å seed exhibited thermally stable Hk about 550 Oe. The 3,000 Å thick FeCo layer on the 1,000 Å seed retained the best properties after the anneal. All the films had anisotropies near 500 Oe and also showed good thermal stability. The moment dilution in this set of samples is 4 to 15 percent from 2.4 T depending on how much FeCo is used on top of the high Hk seed. The moment dilution can further be reduced to levels of 2.2 to 2.3 percent less than 2.4 T, by decreasing the FeCoHo off-axis static deposited film thickness.

Figure 10:
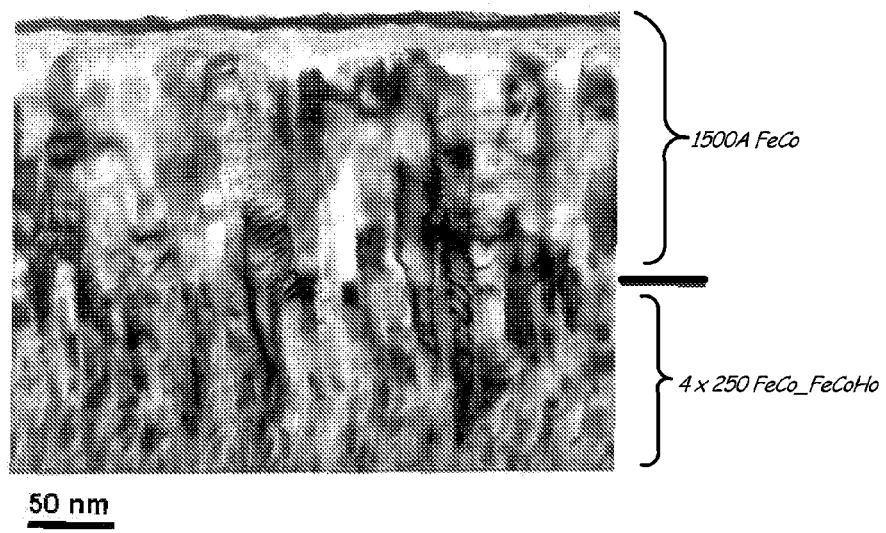
FIG. 10 is a transmission electron micrograph (TEM) of a cross-section of a film with 1,500 Å of FeCo deposited with normal incidence on a 1,000 Å seed layer of static off-axis deposited FeCoHo.

Columnar grain orientations are perpendicular to the substrate surface with the easy axis of magnetization oriented in the plain of the substrate. When a FeCo:FeCoHo film is used as a seed and the FeCo film is normally deposited on the seed, the FeCo film grows with a columnar structure and most importantly maintains the anisotropy of the seed. Seed layers can be from 50 Å to 3,000 Å thick and 1,000 Å is preferred. FeCo layers can be from 50 Å to 5,000 Å and 1,500 Å is preferred. FIG. 10 shows a transmission electron micrograph (TEM) of a film where a 1,500 Å FeCo film has been normally deposited on a 1,000 Å off-axis deposited FeCo:FeCoHo seed. The retention of the columnar structure in the FeCo film is clearly evident.

Figure 11:
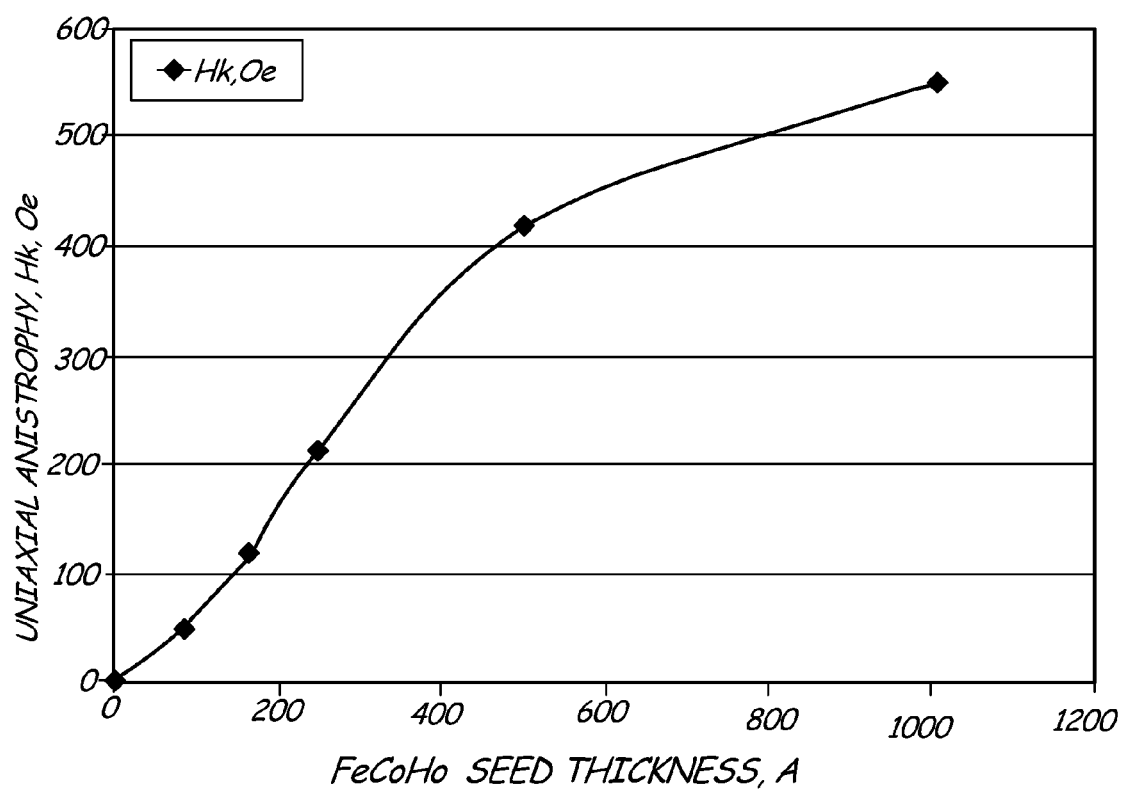
FIG. 11 shows the variation of Hk with FeCoHo seed thickness in a 2000 Å thick (FeCo+FeCoHo) stack.

The anisotropy field strength of FeCo films can also be controlled. FIG. 11 shows the anisotropy of FeCo films on FeCoHo seed layers as a function of the FeCoHo seed thickness. In each case, the total thickness of the (FeCo+FeCoHo) film was kept constant at 2,000 Å. The anisotropy is a smoothly increasing function of the FeCoHo seed thickness and varies from zero to 550 Oe.

Hence this embodiment is a strong candidate for writer pole applications. Benefits are first, a moment close to 2.4 T, second, films of useful thickness, and third, thermally stable anisotropy and tunable anisotropy. This embodiment is also a candidate for other applications, such as magnetic shield applications.

Single and multilayer off-axis deposited films can be used as seeds. In one embodiment, a single off-axis deposited FeCoX film is used as a seed, where X is a transition metal element. In another embodiment, a single off-axis deposited FeCoY film is used as a seed, where Y is a rare earth element. In another embodiment, a single off-axis deposited FeCo(X,Y) film is used as a seed where X is a transition metal element and Y is a rare earth element. In another embodiment, a multilayer off-axis deposited film is used as a seed where the first layer consists of a FeCoX film where X is a transition metal element, and the second layer consists of a FeCoY film where Y is another transition metal element, or a rare earth element. In another embodiment, successive off-axis deposited layers can be built up using any combination of transition metal elements and rare earth elements in each successive layer. The thickness of the seed layers can be up to 5,000 Å. Preferably, the seed layers are 1,000 Å thick. The thickness of the normally deposited FeCo film can be up to 5,000 Å, however, 3,000 Å is preferred.

All the above embodiments with high, thermally stable Hk are candidates for use as high frequency inductors anisotropic screening (shielding) layers, flux guides and other magnetic devices requiring high frequency performance at elevated temperatures.

The benefits of off-axis (OA) deposition of FeCo(X,Y) films are listed below:

(1) High saturation magnetization (Ms) with thermally stable high magnetic anisotropy (Hk) can be achieved by utilizing off-axis (OA) PVD deposition of FeCo(X,Y) where X is a transition metal and Y is a rare earth element. The concentration of Fe is 50-70$^{at}/_o$, the concentration of Co is 30-50$^{at}/_o$ and the concentration of (X+Y) is less than 10$^{at}/_o$.

(2) In FeCo(X,Y) films, Ms, Hk, and thermal stability can be optimized and controlled by choice of off-axis (OA) angle, collimation and other process conditions, such as pressure, rate, temperature, substrate rotation, post annealing etc. For high anisotropy with maximum Ms, a deposition angle between 30 and 50 degrees is typically preferred. For higher anisotropy but lower Ms, a deposition angle between 50 and 80 degrees is typically preferred.

(3) Materials with high Ms, Hk, thermal stability and good uniformity can be obtained by deposition from a single off-axis source, multiple off-axis sources with co-deposition or a combination of off-axis and standard deposition processes. Standard deposition means utilization of a flux normal to a static substrate or off-axis deposition with simultaneous substrate rotation.

(4) Materials with high Ms, Hk, and thermal stability and good uniformity can be obtained through off-axis deposition of two magnetically coupled layers FeCo(X,Y) and FeCo(X', Y') where off-axis deposition and compositions are chosen to optimize Hk in the first layer and optimize Ms in the second layer. It is important to note that the properties of the multilayer system are not the simple average of the isolated layers but can display even higher Ms and Hk.

(5) Materials with high Ms, Hk, thermal stability and good uniformity can be obtained through off-axis deposition of multiple magnetically coupled layers of FeCo(X,Y) to further optimize Ms, Hk, stability, uniformity etc.

(6) Materials with high Ms and Hk formed by off-axis deposition can be used in perpendicular writers to minimize erasure.

(7) Materials with high Ms and Hk formed by off-axis deposition can be used in perpendicular heads for reducing stray field sensitivity of perpendicular recording heads (i.e. by lowering the initial permeability of the materials).

(8) Materials with high Hk formed by off-axis deposition can be used in perpendicular heads for controlling domain structure in various layers (return poles, shields, yoke, etc.) of the perpendicular head.

In another embodiment of this invention, off-axis deposition of NiFeX, NiFeY, or NiFe(X,Y) layers can be used to enhance anisotropy and thermal stability. In another embodiment of this invention, off-axis deposition of FeCoNiX, FeCoNiY, or FeCoNi(X,Y) layers can be used to enhance anisotropy and thermal stability. In another embodiment of this invention, NiFeX, NiFeY, NiFe(X,Y), FeCoNiX, FeCoNiY, or FeCoNi(X,Y) can be used to increase Hk in shield applications to reduce stray field sensitivity.

While the preceding discussion was directed to FeCoX, FeCoY and FeCo(X,Y) films; FeNiX, FeNiCoX, FeNiY, FeNiCoY, FeNi(X,Y) and FeNiCo(X,Y) are included for completeness of this invention where X is at least one of a transition metal element and Y is at least one of a rare earth element. Single and multilayer off-axis deposited FeCoNi(X,Y) films can also be used as seeds. Successive off-axis deposited layers can be built up using any combination of transition metal elements and rare earth elements in each successive layer. The thickness of the seed layers can be up to 5,000 Å. Preferably the seed layers are 1,000 Å thick. The thickness of the normally deposited FeCo film can be up to 5,000 Å, however, 3,000 Å is preferred. In each case, the presence of a transition metal element or a Lanthanide-series rare earth element, or both, allows thermally stable, high anisotropic magnetic films to be produced. Examples of transition metals include, but are not limited to Ta, Ru and Pt. Examples of Lanthanide-series rare earth elements include, but are not limited to Ho, Tb and Nd. Suggested composition limits for FeNiCo(X,Y), where X is at least one of a transition metal and Y is at least one of a rare earth element are (X+Y) about $1^{at}/_o$ to about $10^{at}/_o$, Fe about $50^{at}/_o$ to about $70^{at}/_o$ and (Co+Ni) about $30^{at}/_o$ to about $50^{at}/_o$.

Although the present invention has been described with reference to preferred embodiments, workers skilled in the art will recognize that changes may be made in form and detail without departing from the spirit and scope of the invention.

The invention claimed is:

1. A magnetic thin film structure comprising:
a first magnetic layer of static off-axis deposited magnetic material with predetermined in-plane magnetic anisotropy consisting of FeCoX, FeCoY, FeCo(X, Y), FeNiX, FeNiCoX, FeNiY, FeNiCoY, FeNi(X,Y), or FeNiCo(X, Y) wherein X is at least one additional transition metal element and Y is at least one rare earth element, and wherein the first magnetic layer has Hk greater than about 25 Oe and
maintains thermally stable Hk when subjected to a temperature of 225° C. for two hours; and
at least one additional magnetic layer over the first magnetic layer.

2. The magnetic thin film at least one additional magnetic layer of claim 1, wherein the structure comprises at least a second magnetic layer of magnetic material with a predetermined in-plane magnetic anisotropy direction consisting of FeCoX, FeCoY, FeCo(X, Y), FeNiX, FeNiCoX, FeNiY, FeNiCoY, FeNi(X, Y), and FeNiCo(X, Y), wherein X is at least one additional transition metal element and Y is at least one rare earth element, and wherein the second magnetic layer has Hk greater than about 25 Oe and maintains thermally stable Hk when subjected to a temperature of 225° C. for two hours.

3. The magnetic thin film structure of claim 1, wherein the concentration of Fe is about 50 at. % to about 70 at. %, the concentration of (Ni+Co) is about 30 at. % to about 50 at. % and the concentration of (X+Y) is about 1 at. % to about 10 at. %.

4. The magnetic thin film structure of claim 1, wherein the first magnetic layer includes Y and the rare earth element is at least one of the lanthanide series in the periodic table of the elements.

5. The magnetic thin film structure of claim 1, wherein the first magnetic layer is formed by static off-axis physical vapor deposition (PVD) from at least one off-axis source.

6. The magnetic thin film structure of claim 1, wherein the first magnetic layer is a seed layer, and wherein the at least one additional magnetic layer comprises a a perpendicular deposited layer with in-plane Hk greater than about 25 Oe and thermally stable Hk when subjected to a temperature of 225° C. for two hours.

7. The magnetic thin film structure of claim 1, wherein the magnetic thin film structure is a magnetic component of a perpendicular recording head with an in-plane anisotropic magnetization parallel to an air bearing surface.

8. The magnetic thin film structure of claim 1, wherein the magnetic thin film structure is a magnetic shield with an in-plane anisotropic magnetization parallel to an air bearing surface.

9. The magnetic thin film structure of claim 1 wherein the additional transition metal elements X and rare earth elements Y have atomic radii larger than Fe, Co or Ni.

10. A magnetic thin-film structure comprising:
a seed layer formed by at least one static off-axis deposited magnetic layer consisting of FeCoX, FeCoY, FeCo(X, Y), FeNiX, FeNiCoX, FeNiY, FeNiCoY, FeNi(X, Y), and FeNiCo(X, Y) wherein X is at least one additional transition metal element and Y is at least one rare earth element, and wherein the seed layer has a predetermined in-plane magnetic anisotropy direction with Hk greater than about 25 Oe and thermally stable Hk when subjected to a temperature of 225° C. for two hours; and
a magnetic layer of FeCo over the seedlayer.

11. The magnetic thin film structure of claim 10, wherein the seed layer comprises at least one more magnetic layer consisting of FeCoX, FeCoY, FeCo(X, Y), FeNiX, FeNiCoX, FeNiY, FeNiCoY, FeNi(X,Y), or FeNiCo(X,Y), wherein X is at least one additional transition metal element and Y is at least one rare earth element.

12. The magnetic thin film structure of claim 10, wherein the concentration of Fe is about 50 at. % to about 70 at. %, the concentration of (Ni+Co) is about 30 at. % to about 50 at. % and the concentration of (X+Y) is about 1 at. % to about 10 at. %.

13. The magnetic thin film structure of claim 10, wherein the seed layer includes Y, and Y is one or more rare earth elements of the lanthanide series in the periodic table of the elements.

14. The magnetic thin film structure of claim 10, wherein the seed layer has a predetermined in-plane magnetic anisotropy direction with Hk greater than about 250 Oe and is formed by static off-axis physical vapor deposition (PVD) from at least one off-axis source or multiple off-axis sources.

15. The magnetic structure of claim 10, wherein the structure has Hk greater than about 25 Oe and forms at least a part of one of an inductor, an anisotropic screening layer, an anisotropic shielding layer, a flux guide, or a magnetic device.

16. The magnetic thin film structure of claim 10, wherein the additional transition metal elements X and rare earth elements Y have atomic radii larger than Fe, Co or Ni.

17. A method of forming a magnetic structure comprising:
    static off-axis depositing at least one magnetic layer of magnetic material consisting of FeCoX, FeCoY, FeCo (X, Y), FeNiX, FeNiCoX, FeNiY, FeNiCoY, FeNi(X, Y), or FeNiCo(X, Y) to form a seed layer, wherein X is at least one transition metal element and Y is at least one rare earth element wherein the seed layer has Hk greater than 25 Oe and thermally stable Hk when subjected to a temperature of 225° C. for two hours; and
    depositing a magnetic layer of FeCo over the seed layer.

18. The method of claim 17, wherein the magnetic layer of FeCo is deposited by perpendicular deposition.

19. The method of claim 17, wherein the off-axis depositing occurs at angles of from about 30 degrees to about 80 degrees to an axis perpendicular to a target surface.

20. The method of claim 17, wherein a collimating device is used to limit the incidence angle of deposition flux to desired range of angles.

21. The method of claim 17, wherein a line source for deposition is created by using a shutter containing a slit.

22. The method of claim 17, wherein multiple deposition sources are used simultaneously.

* * * * *

UNITED STATES PATENT AND TRADEMARK OFFICE
CERTIFICATE OF CORRECTION

| | | |
|---|---|---|
| PATENT NO. | : 7,914,916 B2 | Page 1 of 1 |
| APPLICATION NO. | : 12/025275 | |
| DATED | : March 29, 2011 | |
| INVENTOR(S) | : Inturi et al. | |

It is certified that error appears in the above-identified patent and that said Letters Patent is hereby corrected as shown below:

Page 12, "In Claim 2," col. 8, line 3,
insert -- structure of claim 1, wherein the structure --
after -- thin film --

Page 12, "In Claim 2," col. 8, line 4,
delete "of claim 1, wherein the structure"

Page 12, "In Claim 10," col. 8, line 49,
the word -- and -- should be changed to -- or --

Signed and Sealed this
Thirteenth Day of September, 2011

David J. Kappos
*Director of the United States Patent and Trademark Office*